(No Model.) 5 Sheets—Sheet 1.
C. N. DUTTON.
PROPELLING MECHANISM FOR VESSELS.
No. 586,810. Patented July 20, 1897.
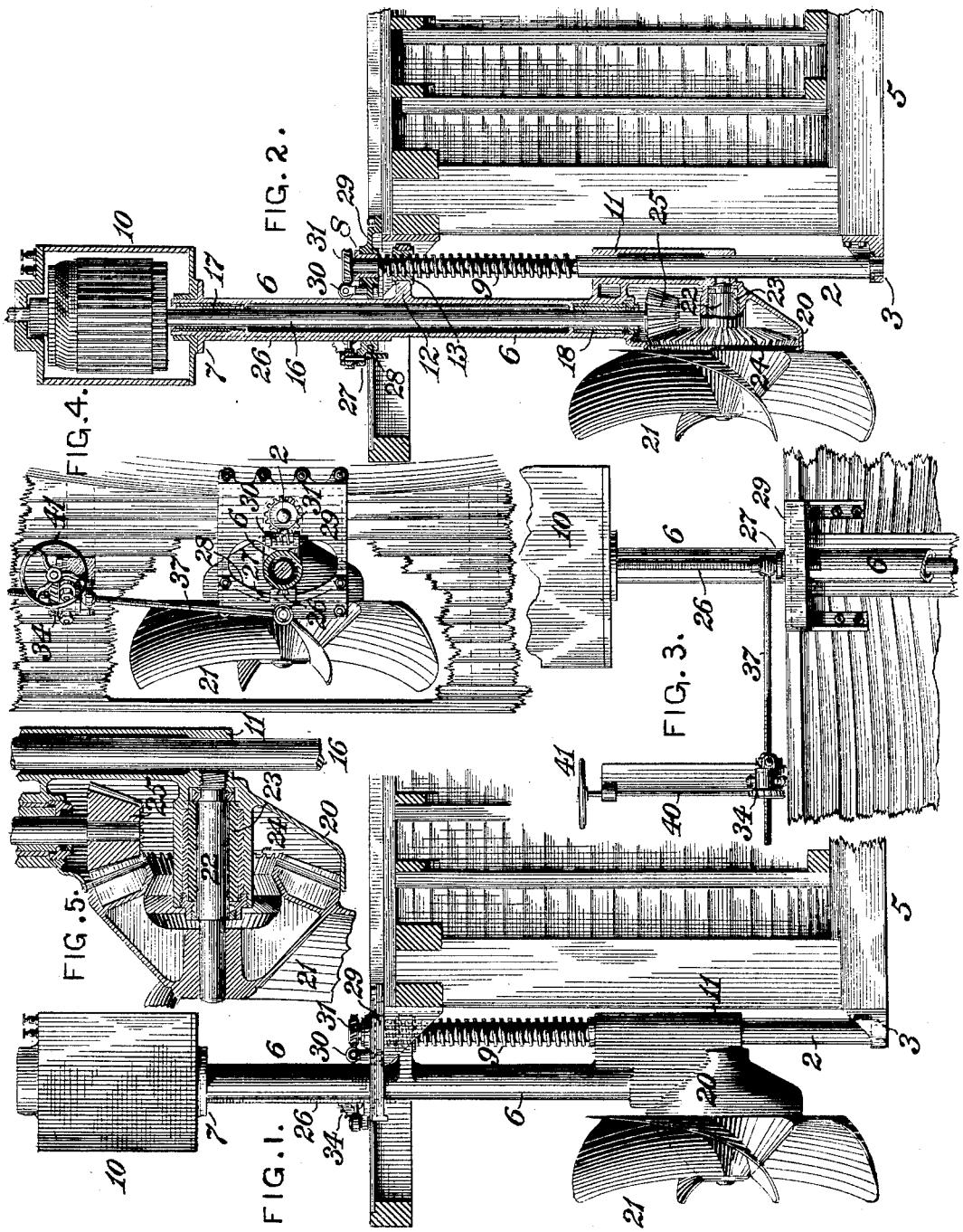
WITNESSES:
T. J. Hogan.
P. E. Gaither.
INVENTOR:
Chauncey N. Dutton,
by J. Snowden Bell
atty.

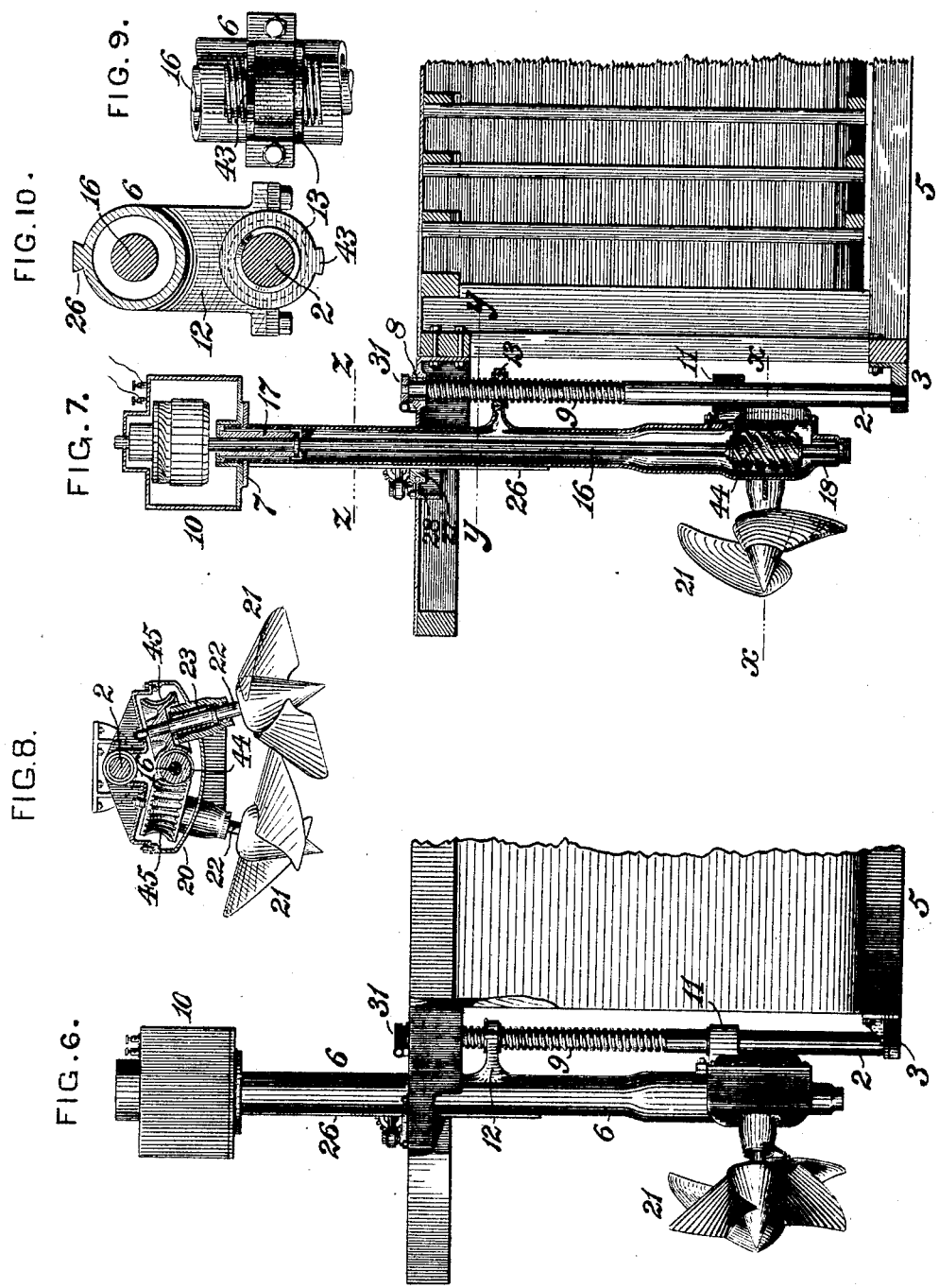

(No Model.) 5 Sheets—Sheet 3.
C. N. DUTTON.
PROPELLING MECHANISM FOR VESSELS.
No. 586,810. Patented July 20, 1897.
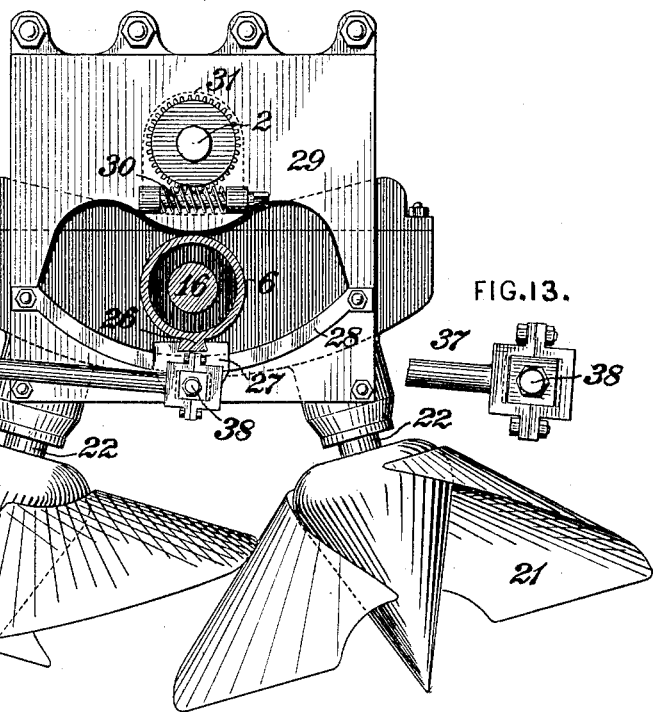
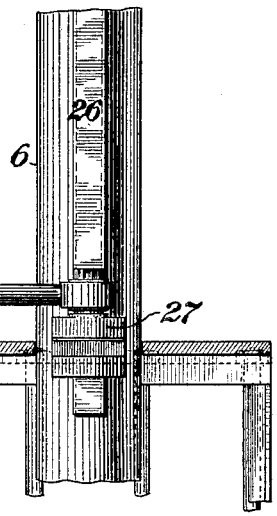
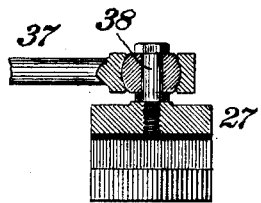
WITNESSES:
INVENTOR:
Chauncey N. Dutton,
by J. Howden Bell
atty.

(No Model.) 5 Sheets—Sheet 4.
C. N. DUTTON.
PROPELLING MECHANISM FOR VESSELS.
No. 586,810. Patented July 20, 1897.
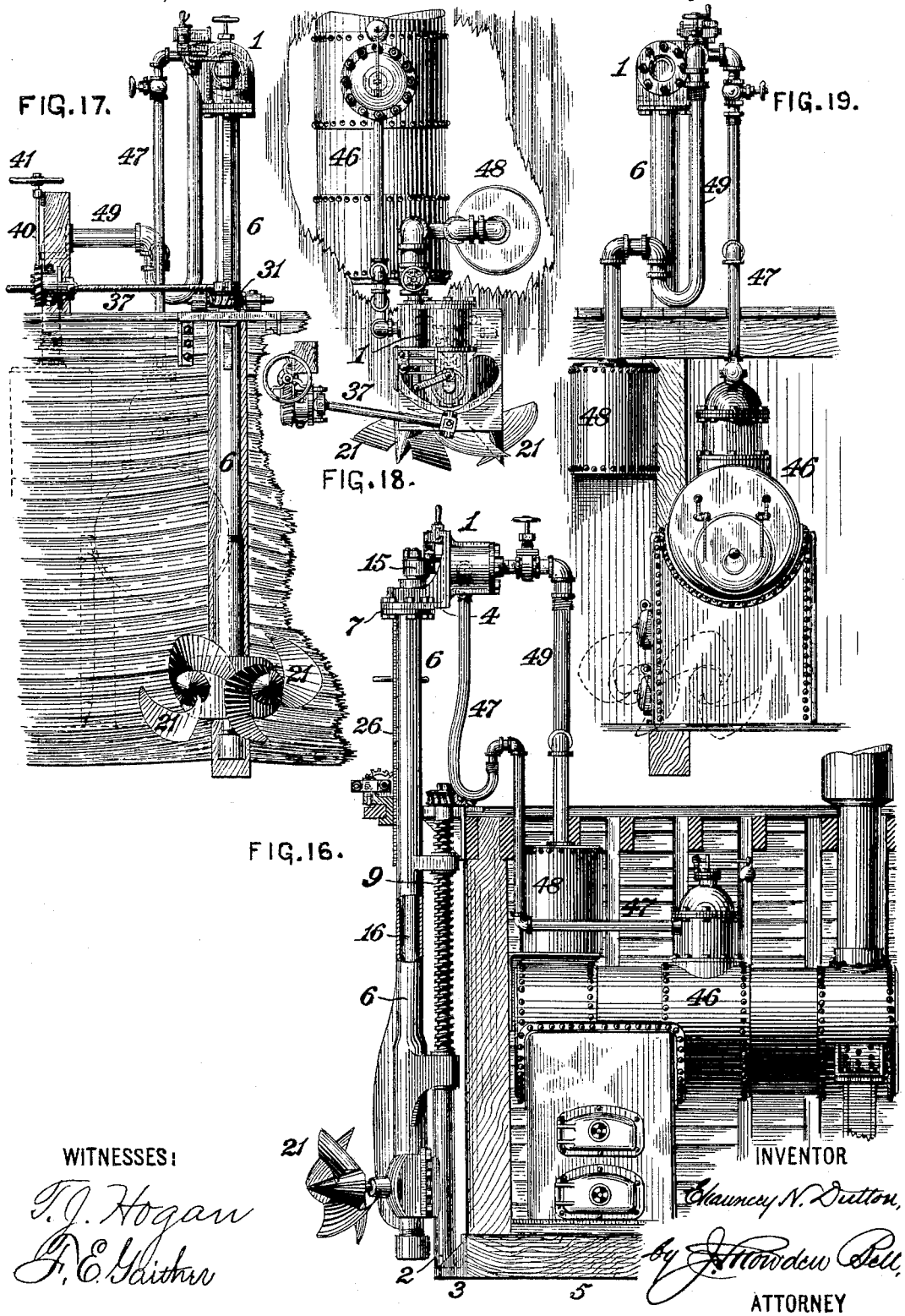

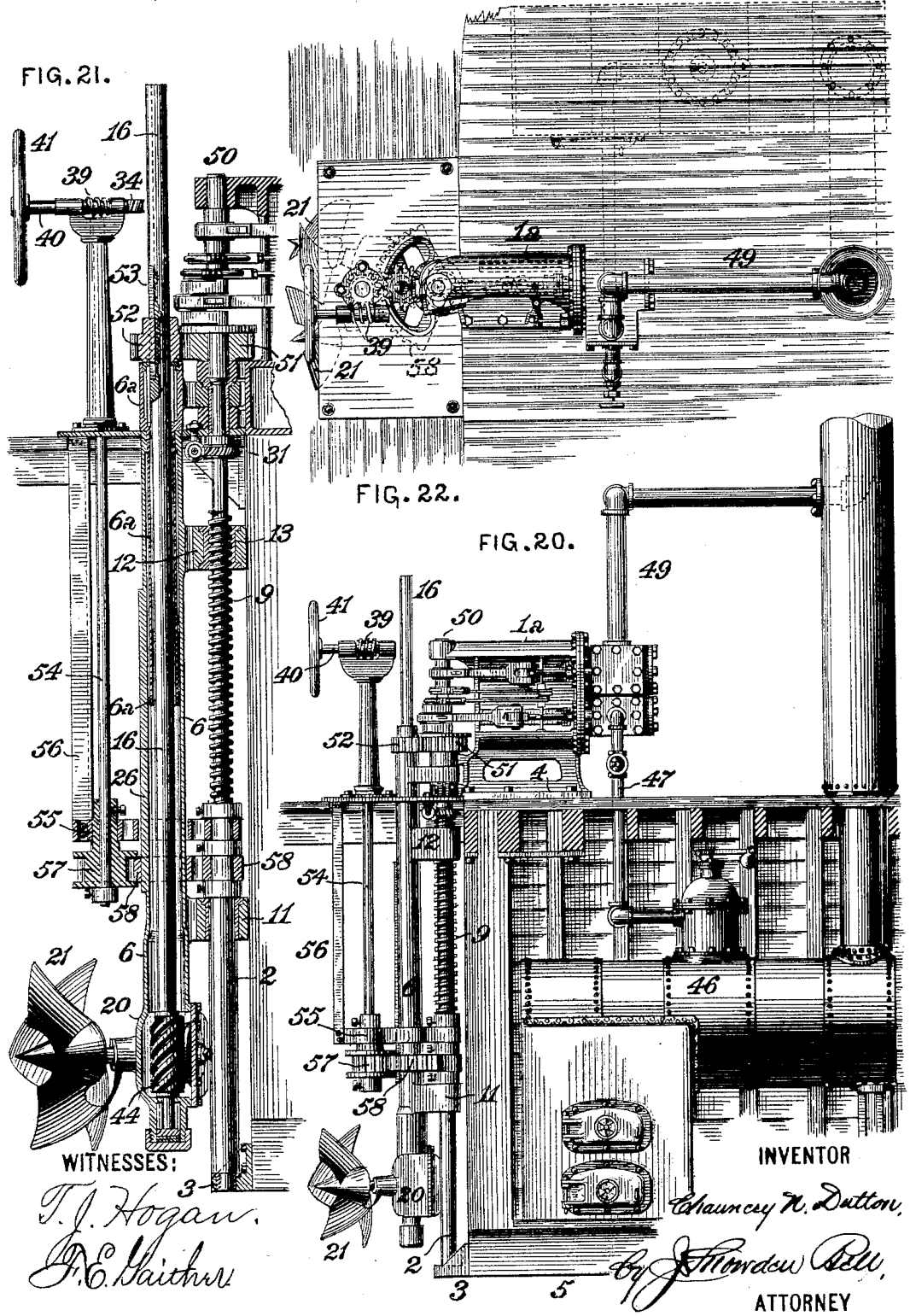

UNITED STATES PATENT OFFICE.

CHAUNCEY N. DUTTON, OF NEW YORK, N. Y.

PROPELLING MECHANISM FOR VESSELS.

SPECIFICATION forming part of Letters Patent No. 586,810, dated July 20, 1897.

Application filed July 27, 1896. Serial No. 600,649. (No model.)

*To all whom it may concern:*

Be it known that I, CHAUNCEY N. DUTTON, of the city, county, and State of New York, have invented a certain new and useful Improvement in Propelling Apparatus for Vessels, of which improvement the following is a specification.

My invention is more particularly designed for, although not limited to, application in the propulsion of canal-barges and other vessels of comparatively light draft of water which is variable materially under different conditions.

The object of the invention is to provide a propelling apparatus in which (a) the motor and propeller shall be connected so as to constitute practically a mechanical unit and the apparatus be vertically adjustable to obtain the proper immersion of the propeller under variations of draft and depth of water, as well as angularly adjustable for steering purposes, without impairing the connection or mechanical relation between the motor and propeller; (b) the connection of the propelling apparatus to the vessel shall be made without perforation of the hull; (c) the capacity of ready and speedy attachment and detachment of the propelling apparatus to and from the vessel shall be afforded; (d) the propelling apparatus shall be capable of lateral adjustment, so as to enable the steering of the vessel to be effected without the employment of a special or independent rudder, and (e) ample facilities shall be provided for the lubrication of the bearings and driving-gearing.

The improvement claimed is hereinafter fully set forth.

In the accompanying drawings, Figure 1 is a vertical longitudinal section through the stern portion of a vessel, illustrating an application of my invention, the propelling apparatus being shown in elevation; Fig. 2, a similar view with the propelling apparatus in vertical central section; Fig. 3, an end view of the upper portion of the propelling and steering apparatus; Fig. 4, a plan or top view of the propelling and steering apparatus; Fig. 5, a vertical central section, on an enlarged scale, through the driving-gearing and its casing; Fig. 6, a side view in elevation of the stern portion of a vessel with a propelling apparatus applied in which two propellers and worm and worm-wheel driving-gear are employed; Fig. 7, a vertical longitudinal central section through the same; Fig. 8, a horizontal section at the line $x\ x$ of Fig. 7; Fig. 9, a front view in elevation and on an enlarged scale of the nut and connections through which the tubular frame is raised and lowered; Fig. 10, a horizontal section on a similar scale at the line $y\ y$ of Fig. 7; Fig. 11, a similar section at the line $z\ z$ of Fig. 7; Fig. 12, a rear view in elevation of the steering mechanism; Fig. 13, a plan view of the end of the connecting-rod thereof which is next the tubular frame; Fig. 14, a vertical section through the block through which the steering mechanism actuates the tubular frame; Fig. 15, a horizontal section through the worm-wheel and universal joint of the steering mechanism; Fig. 16, a vertical longitudinal section through the stern portion of a vessel with my improvement applied, a steam-engine being employed as the motor; Fig. 17, a rear view in elevation of the same; Fig. 18, a plan or top view of the apparatus of Figs. 16 and 17; Fig. 19, a front view of the engine, boiler, and condenser; Fig. 20, a view of the same character as Fig. 16, but illustrating, further, the engine as fixed upon the vessel instead of on the tubular frame and the modification of detail involved in such change of support; Fig. 21, a vertical central section, on an enlarged scale, through the tubular frame of Fig. 20; and Fig. 22, a plan or top view of the apparatus shown in Figs. 20 and 21.

In the practice of my invention, referring first to Figs. 1 to 5, inclusive, I provide as the foundation member of the apparatus a supporting-bar 2, which is provided with end journals and is mounted, in a substantially vertical position and with the capacity of rotation, in a shoe or lower bearing 3, fixed to the rear end of the keel 5 of a vessel on which the apparatus is applied, and in an upper bearing 8, secured to the deck-planking or other portion of the frame above the waterline, the supporting-bar 2 being entirely exterior to the hull of the vessel. The other members of the propelling apparatus are so related to and connected with the supporting-bar, as hereinafter to be described, that by removing the bolts which connect the upper bearing to the frame of the vessel the entire apparatus can be readily and quickly removed and replaced, as required. The lower portion of the supporting-bar is made cylindrical to form a support and pivot for a tubular frame 6, which carries the motor, propeller, and driving-gearing, and a heavy thread is cut upon the upper portion of the supporting-bar, forming a screw 9, by the rotation of which in one or the other direction the frame 6 and the members connected thereto are raised and lowered, as required.

The frame 6 is a substantial tubular member having on its upper end, which extends above the deck of the vessel, an assembling plate or flange 7 for the connection of the motor 10, which in this instance is shown as an electric motor. The frame or casing of the motor is provided with a lower sleeve or socket which fits truly on the upper end of the frame 6 and is secured by bolts to the plate 7 thereof. A long bearing 11, formed on the lower end of the frame 6, fits the cylindrical portion of the supporting-bar 2, and the frame 6 is supported at a higher level on said bar by a nut 13, engaging the screw 9 of the bar and fitting, with a degree of traverse around the axis thereof of about one hundred and twenty degrees, in an arm 14, projecting from the frame 6. The main or driving shaft 16 of the motor is journaled in a bearing 17 at the upper end of the frame 6 and in a bearing 18, fixed therein adjacent to a casing 20, at the lower end thereof, which incloses the bearing and driving-gearing of the propeller-shaft. The screw-propeller 21 is fixed upon a horizontal shaft 22, which is journaled in a bearing 23 in the casing 20 and carries a bevel-gear 24, meshing with a corresponding pinion 25, fixed on the lower end of the driving-shaft 16.

It will be seen from the above description that the members of the propelling apparatus proper are so related and connected as to form a mechanical unit or connected structure which contains no shaft or other member perforating the hull of the vessel and which can be as a whole removed from and replaced in position on the vessel. The structure is further vertically adjustable upon the supporting-bar 2 in order that the propeller may be immersed as deeply as possible in accordance with the varying draft of the vessel when loaded and unloaded, respectively, or with the depth of water available, and has likewise the capacity of angular movement about the supporting-bar as a pivot in order that the vessel may be steered without the use of the independent rudder ordinarily employed for this purpose. Both the vertical and the angular movements of the propelling apparatus are effected without varying the mechanical relations or connections of its members.

In order to raise or lower the propelling apparatus, the supporting-bar 2 is rotated in its bearings in the proper direction, the screw 9 of the bar engaging the nut 13 of the frame 6, and thereby imparting longitudinal movement to the frame, which is held against rotation by a feather or spline 26, fitting a corresponding recess in an adjusting-block 27, to be presently described. The supporting-bar may be rotated by any suitable mechanism—as, for example, a worm 30—journaled in bearings on a guide-plate 29, fixed on the deck of the vessel, the worm 30 engaging a worm-wheel 31 on the upper end of the supporting-bar 2.

Movement in an arc of a circle in either direction about the axis of the supporting-bar 2 is imparted to the frame 6 and the members carried thereon for the purpose of steering the vessel by a steering mechanism which moves the adjusting-block 27 (which, as before stated, engages the spline or feather 26 of the tubular frame 6) on a segmental guide 28, on which said block is adapted to traverse without vertical motion. The guide 28 is formed upon or fixed to the guide-plate 29 and is concentric with the supporting-bar 2, and therefore in the traverse of the adjusting-block 27 upon the guide the engagement of the block with the spline or feather 26 effects the movement of the frame 6 about the supporting-bar 2 as a pivot. The steering mechanism applied in this instance, which is shown on a larger scale in Figs. 11 to 14, inclusive, consists of a nut 32, coupled by a universal joint 33 to a worm-wheel 34, which is journaled in a bearing 35, fixed to the deck or frame of the vessel, said nut 32 engaging a screw-thread 36 on a connecting-rod 37, which is coupled, with the interposition of a bearing with cylindrical-faced ends, to a pin 38, fixed to the adjusting-block 27. The worm-wheel 34 and connected nut 32 are rotated to move the connecting-rod 37 in either direction desired by a worm 40 on a shaft 41, provided with a hand-wheel 42.

In order that the movements of the propelling apparatus above described may be effected as required for steering the vessel without raising or lowering the apparatus, the body of the nut 13, by which the frame 6 is connected to the screw 9 of the supporting-bar, is made cylindrical and fits a corresponding opening in the arm 12 of the frame, and, as shown in Figs. 9 and 10, a stop 43 is formed on the nut, said stop abutting against the arm 12 at the extremity of the traverse of the adjusting-block 27 in either direction and permitting the apparatus to be swung through an arc of about one hundred and twenty degrees without a coincident rotation of the nut 13 on the screw 9. The nut is not, therefore, raised or lowered by the steering movements of the propelling apparatus, and consequently the level of the connected frame and the members thereon is not varied by said movements.

Figs. 1, 2, 3, 6, and 7 show propelling apparatus actuated by an electric motor; but, except under special conditions of service, a steam-engine is preferably employed, as shown in Figs. 16 to 22, inclusive. The constructions shown in Figs. 6, 7, 8, 11, and 16 to 22, inclusive, differ from that first described in the particular that two screw-propellers 21 21 are provided. The combination and relation of the members of the apparatus do not, however, differ substantially from the conditions of the single-screw apparatus, each propeller being fixed upon a shaft 22, journaled in a bearing 23 in the casing 20 of the tubular frame 6, and the propeller-shafts being rotated by a worm 44 on the driving-shaft 16, which engages worm-wheels 45, fixed on the propeller-shafts 22. The thrust-bearings of the propellers are preferably made adjustable and in Fig. 8 are shown as in the form of screws engaging the casing 20 and movable toward and from the propellers, as desired.

The preferred form of apparatus shown in Figs. 16 to 19, inclusive, is similar in all essential particulars other than its motor to the double-screw apparatus before described. The motor is in this construction operated by elastic fluid under pressure, being a steam-engine 1 of simple and compact form, which has been specially designed by me for actuating the propelling apparatus of my present invention, and which as it does not in and of itself form part thereof and is, moreover, fully set forth in a separate application for Letters Patent filed by me of even date herewith need not be herein at length described. The bed-plate 4 of the engine 1 is secured to the assembling-plate 7 of the tubular frame 6, which forms the direct and only support of the engine, and the piston of the engine is directly connected to a crank 15 on the driving-shaft 16, which rotates the propellers 21 21 through the intermediation of gearing, as shown in Figs. 7, 8, and 21. Steam is supplied to the engine 1 from a boiler or generator 46, of any suitable and preferred construction, by a steam-pipe 47, and as the engine changes its position relatively to the boiler and to the condenser 48, (if the engine be of the condensing type, as shown,) in accordance with the elevation or depression and the lateral movements of the tubular frame 6, to which it is fixed, the steam-pipe 47 and the exhaust-pipe 49 (when the latter leads to a condenser) are made flexible to admit of the variation of level and of angular relation of the engine to the axis of the boiler without impairing its connections with the relatively fixed boiler and condenser. To this end one or more sections of the steam and exhaust pipes 47 and 49 may be made of flexible hose, or the pipes may be provided with telescopic sections and sliding joints, various constructions of which are known in the arts, adapted to maintain continuity of communication through the pipes in the different positions which the engine may assume in the raising and lowering of the propelling apparatus and in the steering movements thereof.

In the construction shown in Figs. 20 to 22, inclusive, the driving-shaft 16 and the propeller-shafts geared thereto are rotated by an ordinary two-cylinder compound engine 1ª, the bed-plate 4 of which is fixed to the deck or framing of the vessel instead of on the tubular frame 6, as in the last preceding case. The steam-pipe 47, leading from the boiler 46, and the exhaust-pipe 49 may therefore be of the ordinary type. The removal of the motor from a support on the tubular frame 6 also involves the following structural modification of the driving mechanism and steering-gear:

The tubular frame 6 is in this case provided with an upper fixed section 6ª, projecting in telescopic form into the main body of the frame 6, which is movable vertically and carries the propellers and their driving-gearing, the bearing 11, arm 12, and nut 13, as before described. The pistons of the engine 1ª are coupled to a vertical crank-shaft 50, carrying a spur-gear 51, which engages a corresponding pinion 52, supported on the fixed section 6ª of the tubular frame, and having a longitudinal spline or feather fitting a corresponding keyway 53 in the driving-shaft 16. Rotation is thereby imparted from the engine to the driving-shaft 16 without interfering with the vertical movements of the latter in the raising and lowering of the tubular frame 6 and propellers 21.

The operating-shaft 40, which carries the hand-wheel 41 of the steering-gear, is in this case journaled horizontally in bearings, and its worm 39 engages a worm-wheel 34 on a vertical shaft 54, the lower end of which is mounted in a bearing 55, suspended from the framing of the vessel by hangers 56 at a level below the screwed portion of the supporting-bar 2. A spur-pinion 57, fixed upon the shaft 54 at or near its lower end, engages a segment-gear 58, which is fitted to turn freely on the supporting-bar 2 and is provided with a longitudinal keyway fitting the spline or feather 26 of the tubular frame 6. By rotating the shaft 54 and pinion 57 in either direction the tubular frame and connected propeller may be swung to the right or to the left on the supporting-bar 2 as a pivot to effect the steering of the vessel.

The construction of the frame 6, on which the propeller is supported and with which it is movable both vertically and laterally in tubular form, and with a casing inclosing the bearing and driving-gearing of the propeller-shaft, as herein described and shown, enables ample and efficient lubrication of said bearing and gearing, as well as of the lower bearing of the driving-shaft, to be readily effected whenever required. Such tubular construction, while deemed by me preferable for this reason, is not, however, an essential of my invention, and the frame 6 may, if preferred, be made in open or skeleton form without departure from the governing principles thereof.

I claim as my invention and desire to secure by Letters Patent—

1. The combination, in a propelling apparatus for vessels, of a supporting-bar, mounted in bearings on the outside of the hull of a vessel, a tubular frame supported on said bar and having a chamber or casing near its lower end which is open to its bore, a driving-shaft journaled in bearings in the upper end of said tubular frame and in the casing thereof, a motor connected to the driving-shaft, a propeller fixed on a shaft which is journaled in the casing, and gearing, inclosed in the casing, through which rotation is imparted to the propeller-shaft from the driving-shaft.

2. The combination, in a propelling apparatus for vessels, of a supporting-bar journaled in bearings on the outside of a vessel, a screw-thread on said supporting-bar, a frame having a lateral bearing fitting said supporting-bar, and a nut engaging the screw-thread thereon, means for holding said frame as against movement about the axis of the supporting-bar, mechanism for rotating the supporting-bar in its bearings, a driving-shaft journaled in said frame, a motor connected to the driving-shaft, and a propeller having its shaft journaled in the frame and actuated by the driving-shaft.

3. The combination, in a propelling apparatus for vessels, of a supporting-bar mounted in bearings on the outside of a vessel, a frame supported and pivoted on said bar, and carrying a driving-shaft and a propeller rotated by said shaft, a motor connected to the driving-shaft, a block connected to the frame, a fixed guide on which said block traverses in an arc concentric with the supporting-bar, a nut, a hand-wheel by which said nut is rotated, and a connecting-rod, having a screw-thread engaging said nut and coupled to the block.

4. The combination, in a propelling apparatus for vessels, of a supporting-bar mounted in bearings on the outside of a vessel, a frame supported and pivoted on said bar with the capacity of movement longitudinally thereon, a driving-shaft journaled in the frame, a motor connected to the driving-shaft, a propeller having its shaft journaled in the frame and rotated by the driving-shaft, a block engaging a spline or feather on the frame, a fixed guide on which said block traverses in an arc concentric with the supporting-bar, a pair of gears rotated by a hand-wheel, a nut coupled, by a universal joint, to one of said gears, and a connecting-rod having a screw-thread engaging said nut, and coupled to the block.

CHAUNCEY N. DUTTON.

Witnesses:
GEO. A. VAILLANT,
FRED. W. WALKER.